(12) United States Patent
Jung

(10) Patent No.: US 12,101,860 B2
(45) Date of Patent: Sep. 24, 2024

(54) LIGHT EMITTING DEVICE CAPABLE OF ADJUSTING INTENSITY AND CURING APPARATUS EMPLOYING THE SAME

(71) Applicant: Jae-hyun Jung, Suwon-si (KR)

(72) Inventor: Jae-hyun Jung, Suwon-si (KR)

( * ) Notice: Subject to any disclaimer, the term of this patent is extended or adjusted under 35 U.S.C. 154(b) by 165 days.

(21) Appl. No.: 17/985,670

(22) Filed: Nov. 11, 2022

(65) Prior Publication Data

US 2023/0073403 A1    Mar. 9, 2023

Related U.S. Application Data

(63) Continuation-in-part of application No. 17/343,700, filed on Jun. 9, 2021, now abandoned.

(51) Int. Cl.
| | | |
|---|---|---|
| *H05B 47/105* | (2020.01) | |
| *G01J 1/04* | (2006.01) | |
| *G01J 1/42* | (2006.01) | |

(52) U.S. Cl.
CPC .......... *H05B 47/105* (2020.01); *G01J 1/0407* (2013.01); *G01J 1/0411* (2013.01); *G01J 1/42* (2013.01)

(58) Field of Classification Search
CPC ..... H05B 47/105; G01J 1/0407; G01J 1/0411; G01J 1/42

See application file for complete search history.

(56) References Cited

U.S. PATENT DOCUMENTS

2020/0155718 A1*  5/2020  Yamaha ................ H01L 31/153

* cited by examiner

*Primary Examiner* — Henry Luong

(57) ABSTRACT

Disclosed are a light emitting device configured to control the light output of a light emitting unit and a curing apparatus employing the same. The disclosed light emitting device may comprise: a main body having a window; a light source installed in the main body, for generating light of a predetermined wavelength and irradiating the generated light to the outside of the main body through the window; a photodetector installed in the main body, for receiving part of the light irradiated from the light source and monitoring the intensity of the light source; a light path converting unit installed between the light source and the photodetector, for transferring the part of the light irradiated from the light source to the photodetector; and an intensity adjusting unit for adjusting the intensity of the light source based on the signal detected from the photodetector.

18 Claims, 12 Drawing Sheets

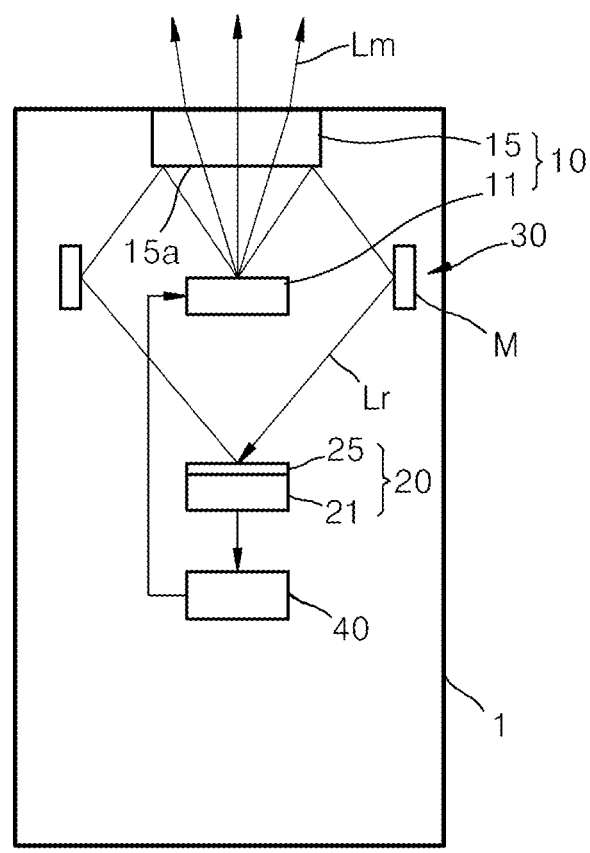
[FIG. 1]

[FIG. 2]
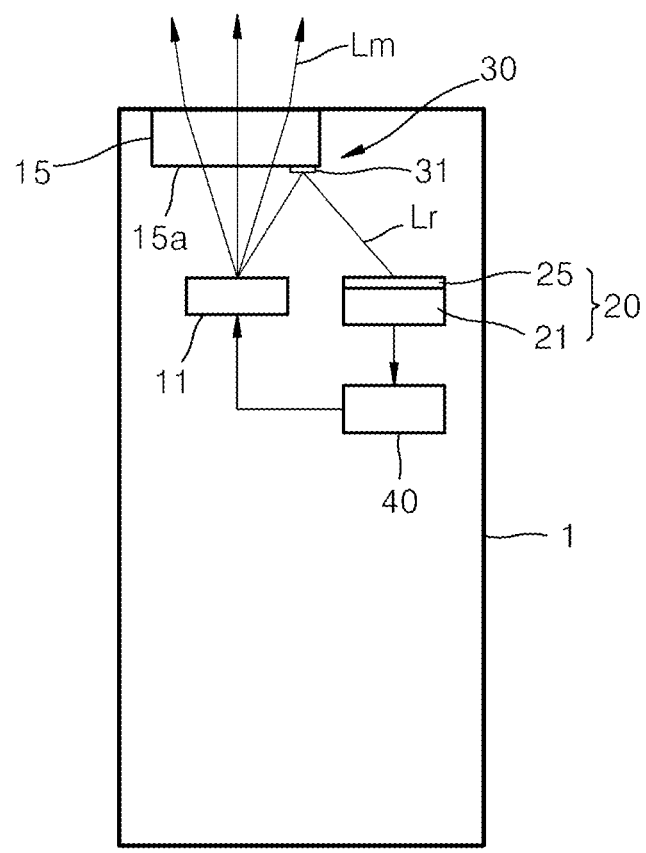

[FIG. 3]
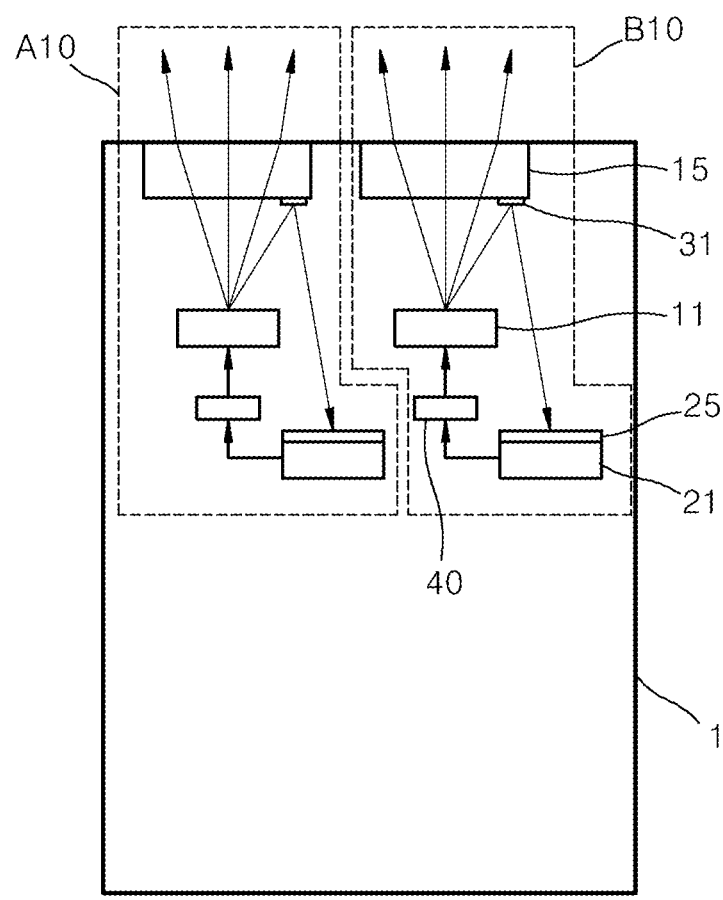

[FIG. 4]
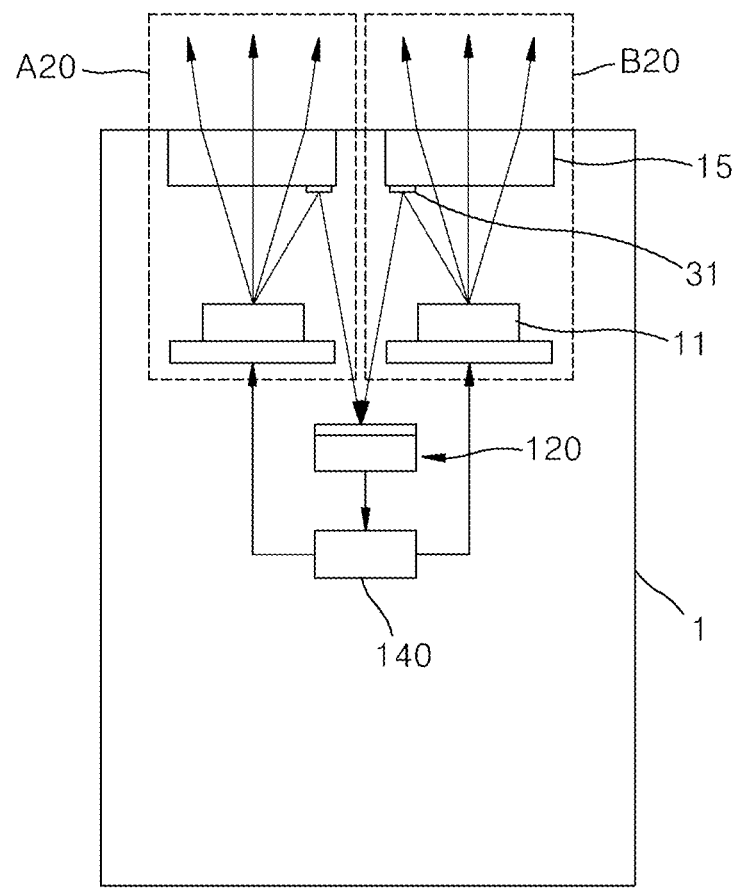

[FIG. 5]
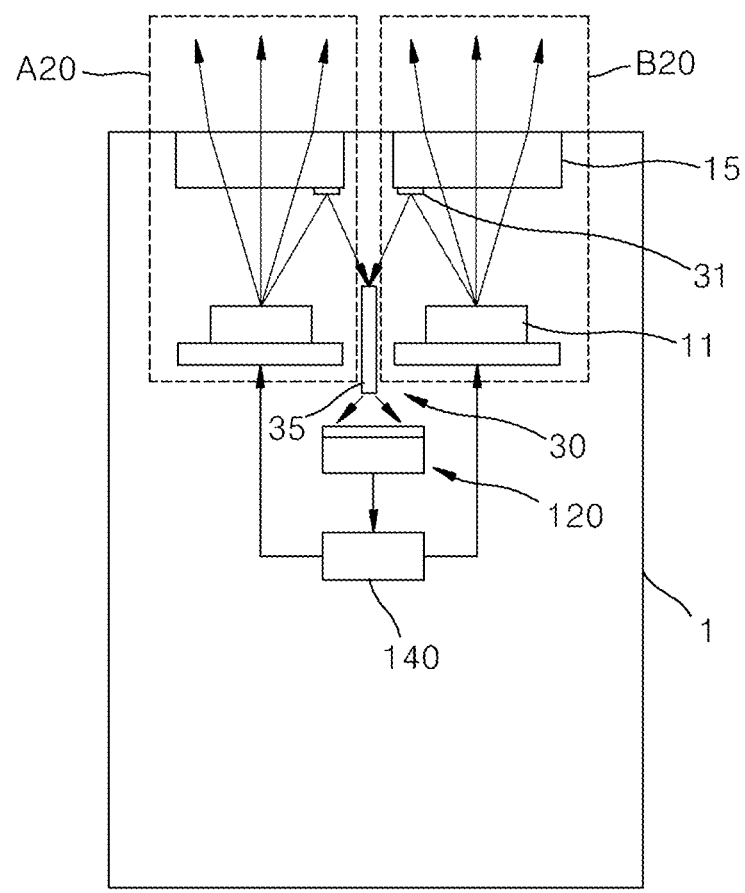

[FIG. 6]
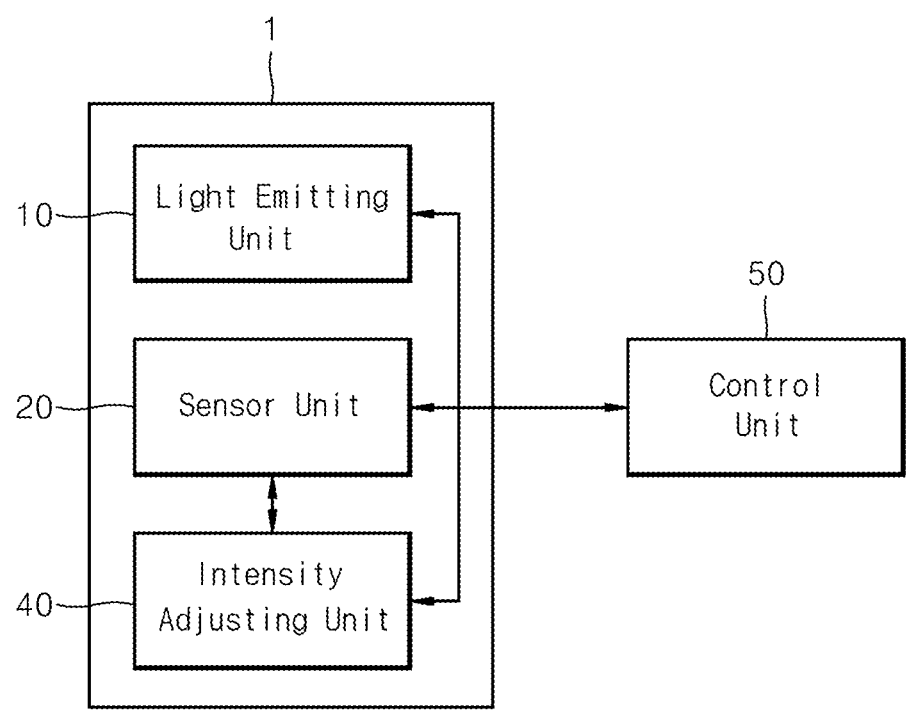

[FIG. 7]
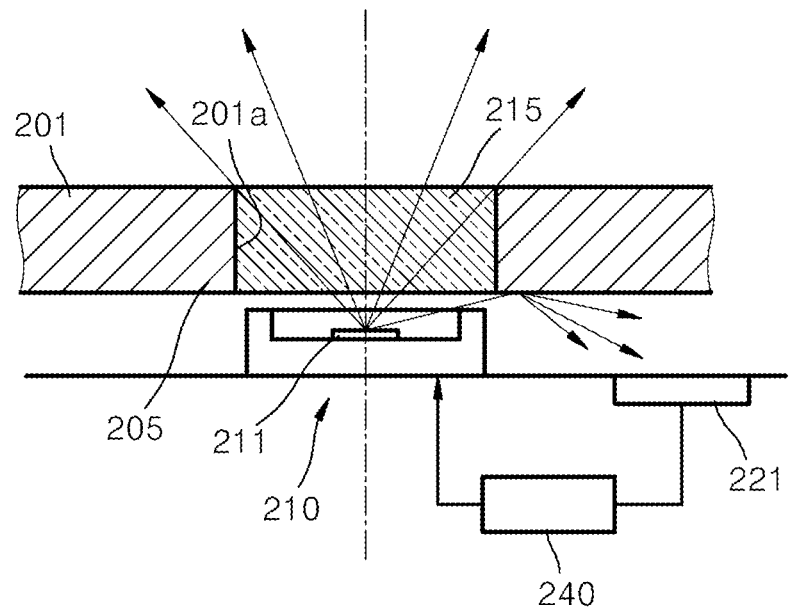
[FIG. 8]
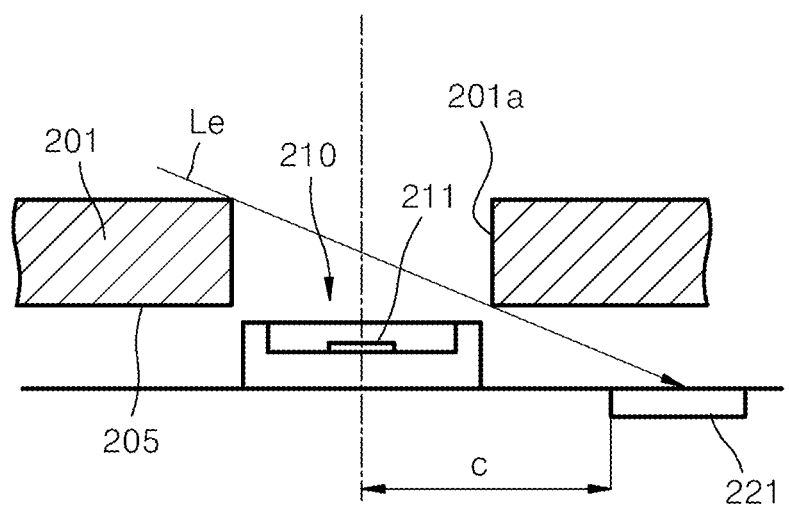

[FIG. 9]
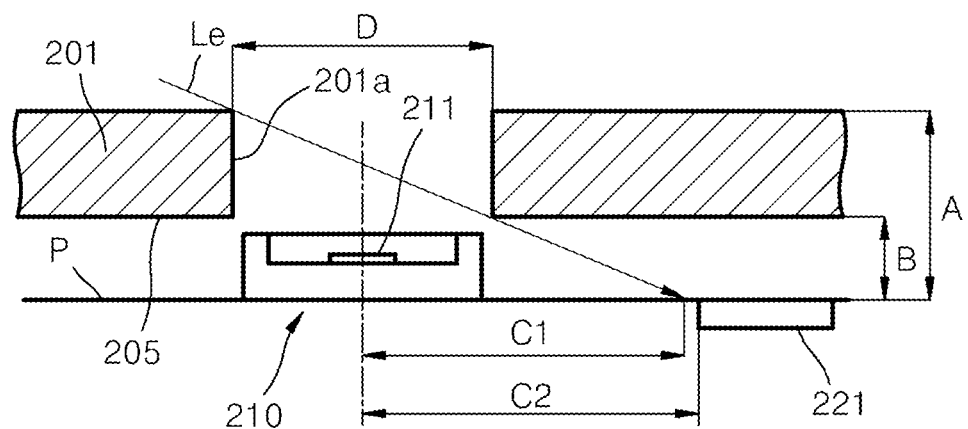
[FIG. 10]
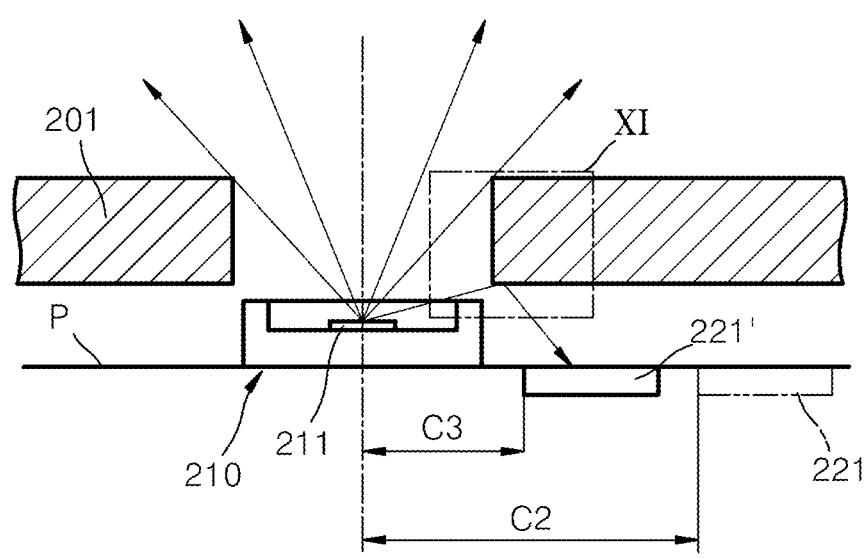

[FIG. 11]
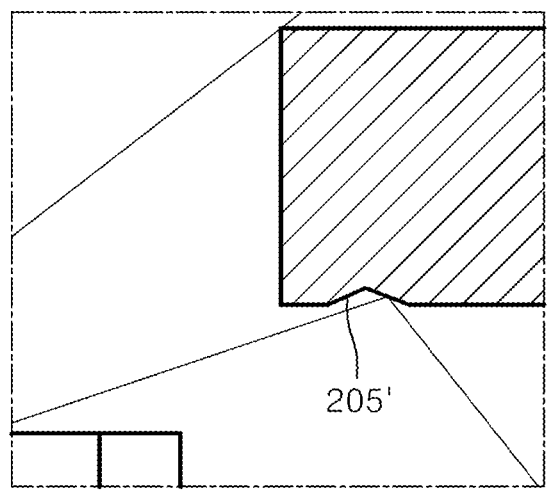
[FIG.12]
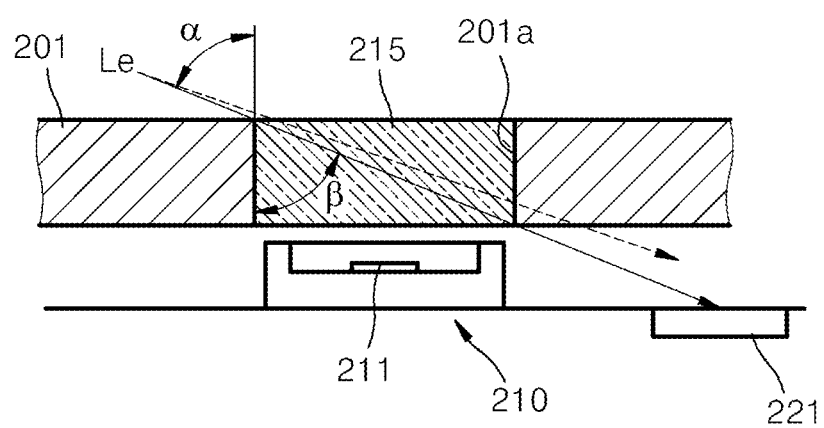

[FIG. 13]
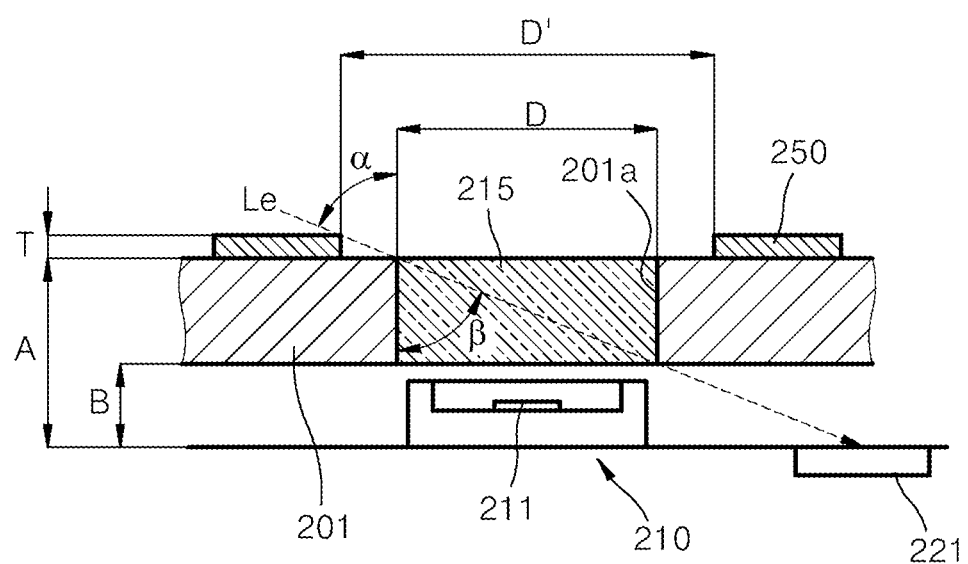

[FIG. 14]
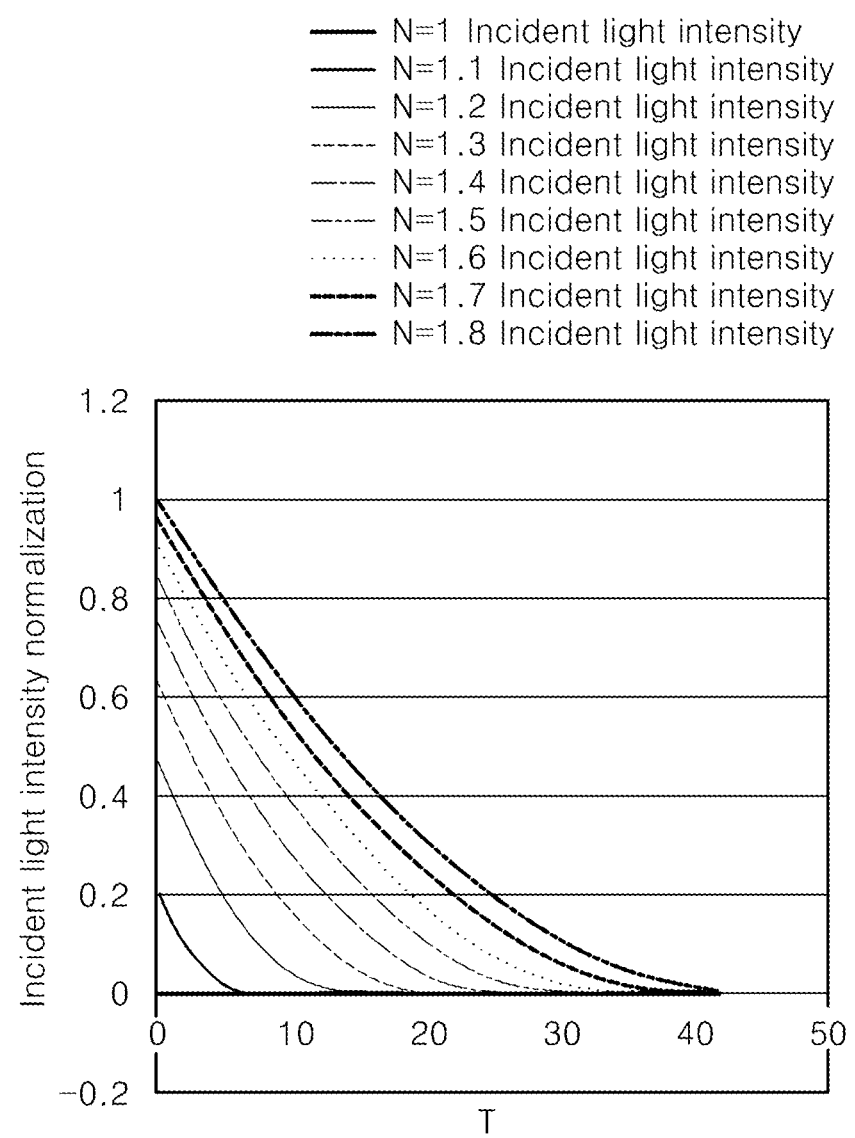

[FIG. 15]
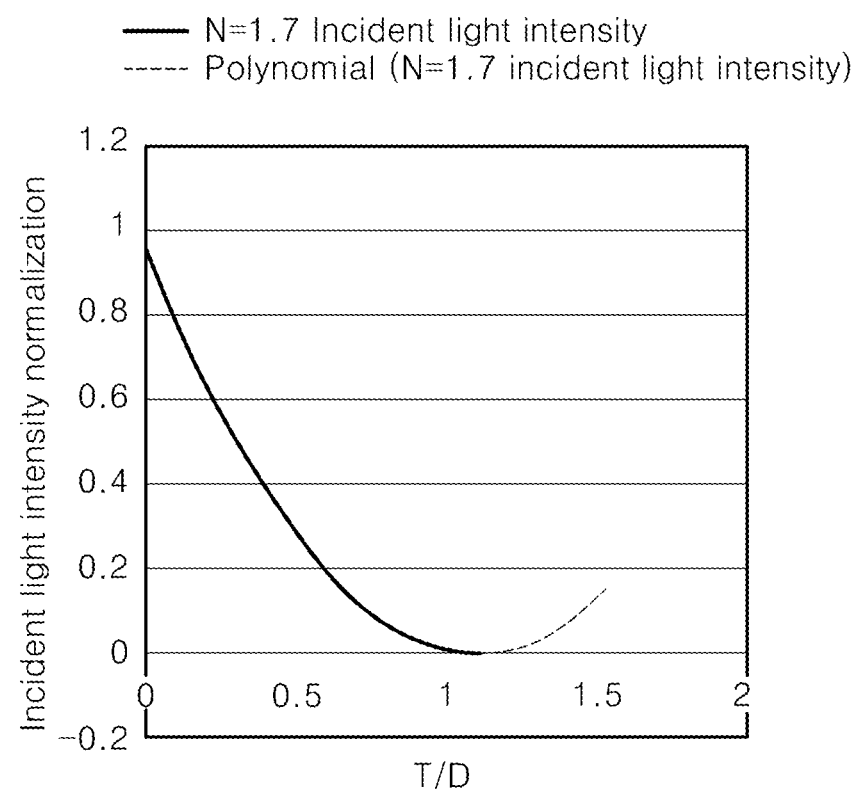

LIGHT EMITTING DEVICE CAPABLE OF ADJUSTING INTENSITY AND CURING APPARATUS EMPLOYING THE SAME

1. FIELD

The present disclosure relates to a light emitting device for irradiating light of a predetermined wavelength and a curing apparatus employing the same, and more particularly, to an intensity-adjustable light emitting device, which is configured to real-time control the light output of a light emitting unit, and a curing apparatus employing the same.

2. DESCRIPTION OF THE RELATED ART

In general, a light emitting device includes a light source for irradiating light of a predetermined wavelength and may be classified according to the wavelength of the irradiated light or the kind of light source.

The light emitting device may be classified into a lamp type light emitting device and a light emitting diode (to be referred to as "LED" hereinafter) type light emitting device according to the light source.

The lamp type light emitting device employs, as a light source, a lamp for emitting intrinsic wavelengths according to use environments of a mercury lamp, a metal lamp, etc. The lamp type light emitting device is relatively low priced and is capable of generating light having a wavelength over a broad band from short wavelengths to long wavelengths. However, the lamp type light emitting device is disadvantageous in that a compact structure is difficult to achieve, the lifetime thereof is short, and thermal damages may be caused to surrounding structures due to radiation of heat rays.

The LED type light emitting device is disadvantageous in that it is more expensive than the lamp type light emitting device and has poor heat resistance. However, the LED type light emitting device is advantageous in that a compact structure is enabled by using an LED light source, the lifetime of the LED light source is drastically long, heat rays are barely radiated owing to emission of single-wavelength light, and the LED is capable of emitting high-output light, specifically UV light. Therefore, the LED type light emitting device is widening its influence in the market.

In the LED type light emitting device, it is necessary for the LED light source to maintain stable light output. Meanwhile, the LED light source may have varying light outputs and center wavelengths by a temperature change due to heat generation or deterioration of the light source due to long-time use. Therefore, the LED type light emitting device requires technology for constantly maintaining the light output and center wavelength through real-time feedback control of LED.

The LED type light emitting device may be classified into a light emitting device for lighting and a light emitting device for sterilization according to the intended use.

When the light emitting device for lighting loses its lighting function, a safety problem may occur. When used for sterilization, the light emitting device irradiates light of ultraviolet wavelength. The light emitting device for sterilization is manufactured so as not to emit ultraviolet rays to the outside of the device because the ultraviolet rays are harmful to the human body. Therefore, even when the function of the light emitting device is lost, it is not possible to identify such malfunction of the light emitting device with the naked eye. Accordingly, a technology for detecting the malfunction and checking whether there is abnormality in the LED through real-time feedback is required.

SUMMARY

The present disclosure has been proposed in view of the above-described feature, provided is a light emitting device capable of real-time monitoring the light output of a light source, constantly maintaining the light output and center wavelength of the light source and checking the abnormality of the light source on the basis of the monitoring, and a curing apparatus employing the same.

To achieve the above objects, provided is a light emitting device may comprising: a main body having a window; a light source installed in the main body, for generating light of a predetermined wavelength and irradiating the generated light to the outside of the main body through the window; a photodetector installed in the main body, for receiving part of the light irradiated from the light source and monitoring the intensity of the light source; a light path converting unit installed between the light source and the photodetector, for transferring the part of the light irradiated from the light source to the photodetector; and an intensity adjusting unit for adjusting the intensity of the light source based on the signal detected from the photodetector.

The light emitting unit may further include a filter member disposed between the light path converting unit and the photodetector, for filtering the light of a predetermined wavelength to travel toward the photodetector.

The light emitting unit may further include an optical member installed on the window, for transmitting most of the light irradiated from the light source in predetermined magnification power, wherein the part of the light irradiated from the light source is reflected on the light incident surface of the optical member, and the light path converting unit comprises a mirror for reflecting the light reflected from the optical member to travel toward the photodetector.

In addition, the light path converting unit may include a reflection member, formed on the light incident surface of the optical member, for reflecting the part of the light irradiated from the light source to travel toward the photodetector.

In addition, the light path converting unit may include a waveguide tube, installed between the reflection member and the photodetector, for guiding the light reflected from the reflection member to the photodetector.

Here, when the light source, the photodetector, the light path converting unit, and the intensity adjusting unit are referred to as a light emitting module, two or more light emitting modules each independently driven are included in the main body.

Here, when the light source and the light path converting unit are referred to as a light emitting module, a plurality of light emitting modules are included in the main body, and each of the photodetector and the intensity adjusting unit is commonly applied to at least two of the plurality of light emitting modules.

In addition, the photodetector may be disposed to be adjacent to the light source, and includes a reflection surface formed on the internal surface around the window and allowing incident light to be totally reflected.

In addition, the photodetector is disposed to be spaced a distance C2 apart from the center of the light source, and the distance C2 satisfies the conditional formula $$C2 > \frac{D(A+B)}{2(A-B)}$$

to prevent the external light Le incident from the outside of the main body from being incident into the photodetector. Here, C2 is a distance between the center of the light source and the photodetector on a plane P extending from the light receiving surface of the photodetector, D is a diameter of the window, A is a distance between the plane P and the external surface of the main body, and B is a distance between the plane P and the internal surface of the main body.

In addition, the photodetector is fixedly disposed such that the distance between the light source and the photodetector becomes an arbitrary distance (W), and the distance A between the plane P and the external surface of the main body satisfies the conditional formula $$A > \frac{B(2W+D)}{(2W-D)}.$$

Here, D is a diameter of the window, and B is a distance between the plane P and the internal surface of the main body.

Here, a groove is recessed in the reflection surface so as to change the reflection angle of the reflected light.

The light emitting unit may further include a transparent optical member having a refractive index n2, installed on the window, for transmitting most of the light irradiated from the light source in predetermined magnification power; and a light blocking unit having an opening coaxially opened by a diameter D' on the window, made of an opaque material having a thickness T, and blocking the external light from entering the main body through the window.

In addition, wherein the thickness T of the light blocking unit satisfies the conditional formula $$T \geq \frac{A-B}{D} \cdot \{\frac{D+D'}{2} - (A-B)\}\tan^{-1}\left[\frac{\sin\{\pi/2 - \tan^{-1}(\frac{A-B}{D})\}}{n_2}\right].$$

Here, A is a distance between the incident plane of the photodetector and the external surface of the main body, B is a distance between the incident plane of the photodetector and the internal surface of the main body, and D is a diameter of the window. In addition, the refractive index n2 of the optical member is 1-1.7.

According to another aspect, a curing apparatus according to the present disclosure may include: the light emitting device; and a control unit, installed outside a main body, for controlling a light emitting unit and a sensor unit, respectively, according to curing conditions.

As described above, in the light emitting device according to the present disclosure, the light output of the light source for irradiating light of a predetermined wavelength may be real-time monitored through a sensor unit and may be controlled through an intensity adjusting unit. Therefore, the light emitting device according to the present disclosure can maintain the light output of the light source to be within a constant range even when there is an environmental change, such as a temperature change or deterioration of the light source due to long-time use.

In addition, the curing apparatus according to the present disclosure employs a light emitting device, thereby accurately controlling the light output of the light source and checking whether there is abnormality in the light emitting device. Therefore, the illumination light having intensity meeting the curing conditions can be irradiated, and the safety-related problem and functional abnormality of the device due to the abnormality of the illumination light can be checked in real time.

BRIEF DESCRIPTION OF THE DRAWINGS

FIG. 1 is a schematic view showing a light emitting device according to a first embodiment of the present disclosure.

FIG. 2 is a schematic view showing a light emitting device according to a second embodiment of the present disclosure.

FIG. 3 is a schematic view showing a light emitting device according to a third embodiment of the present disclosure.

FIG. 4 is a schematic view showing a light emitting device according to a fourth embodiment of the present disclosure.

FIG. 5 is a schematic view showing a light emitting device according to a fifth embodiment of the present disclosure.

FIG. 6 is a schematic block diagram showing a curing apparatus employing a light emitting device according to an embodiment of the present disclosure.

FIG. 7 is a schematic view showing a light emitting device according to a sixth embodiment of the present disclosure.

FIG. 8 shows an example in which external light is incident into a photodetector through a window of a main body in a state in which a transparent member of structures shown in FIG. 7 is absent.

FIG. 9 shows a modification example of the light emitting device according to a sixth embodiment of the present disclosure.

FIG. 10 shows another modification example of the light emitting device according to a sixth embodiment of the present disclosure, and FIG. 11 is a partially enlarged view of a portion XI shown in FIG. 10.

FIG. 12 shows a beam path of external light when an optical member having a refractive index n2 is installed in the window of FIG. 7.

FIG. 13 is a schematic diagram showing a light emitting device according to a seventh embodiment of the present disclosure.

FIG. 14 is a graph representing the relationship between a T value and an incident light intensity (normalization) with a refractive index n2 increasing by 0.1 from 1.0 to 1.8.

FIG. 15 is a graph representing the relationship between a T/D value an incident light intensity (normalization) when the refractive index n2 is 1.7.

DETAILED DESCRIPTION

Hereinafter, a light emitting device capable of adjusting intensity and a curing apparatus employing the same, according to embodiments of the present disclosure, will be described in greater detail with reference to the accompanying drawings.

In the accompanying drawings, to clearly explain the present disclosure, portions irrelevant the description will be omitted, and like numerals refer to like elements throughout.

FIG. 1 is a schematic view showing a light emitting device according to a first embodiment of the present disclosure.

Referring to FIG. 1, the light emitting device according to a first embodiment may include a main body 1, and a light emitting unit 10 a sensor unit 20, a light path converting unit 30 and an intensity adjusting unit 40, which are installed in the main body 1.

The main body 1, which means a housing of the light emitting device according to the present disclosure, may be formed in various shapes modified according to uses. For example, the main body 1 may be shaped of a cylinder having a diameter of about 10 mm. In addition, the main body 1 may be shaped to have an increased diameter so as to include multiple light emitting units 10 contained therein.

The light emitting unit 10 is installed in the main body 1 and generates and irradiate light of a predetermined wavelength. To this end, the light emitting unit 10 may include a light source 11 for generating and irradiating light, and an optical member 15.

The light source 11 may be constituted by a semiconductor LED. For example, the light source 11 may be constituted by a chip on board (COB) having an LED chip mounted on a substrate, a surface mount device (SMD) LED device, or the like. The wavelength of light irradiated from the light source 11 may be set in various manners according to use.

Preferably, the light source 11 may irradiate light of a UV wavelength. Ultraviolet (to be referred to as "UV", hereinafter) refers to light having a wavelength range of 10 to 400 nm (energy range of 3 eV to 124 eV), and is a general term for an electromagnetic wave having a wavelength shorter than visible light and longer than X ray. The UV has a chemical property of breaking a molecular bond due to its high photon energy when being absorbed into a material, and thus induces a unique sterilizing reaction and photochemical reaction. Accordingly, a UV light emitting device for irradiating UV is being utilized in various technical fields including many industrial areas, a medical area, a beauty area, etc. For example, the UV light emitting device may be applied to a UV curing apparatus that is equipment for firmly solidifying a liquid-phase paint, ink, adhesive, etc. using a photochemical reaction of UV.

The optical member 15 is disposed on the light source 11 and performs a function of a transparent window for transmitting light to the outside of the main body 1. That is, the optical member 15 allows most light (Lm) of the light irradiated from the light source 11 to be transmitted in predetermined magnification power. The optical member 15 may be composed of a lens having positive (+) refractive power and a lens having negative (−) refractive power according to the use of the light emitting device according to the present disclosure. Here, partial light (Lr) of the light irradiated from the light source 11 may be reflected from a light incident surface 15a of the optical member 15 to the light path converting unit 30.

The sensor unit 20 receives part of the light irradiated from the light emitting unit 10 and monitors intensity of the light emitting unit 10. The sensor unit 20 may include a photodetector 21 and a filter member 25. The photodetector 21 may receive the light irradiated from the light source 11 and having a light path converted by the light path converting unit 30 and may then real-time monitor the light output of the light source 11. The photodetector 21, which is a photoelectric conversion element, transmits an electric signal corresponding to the amount of the received light to the intensity adjusting unit 40. The filter member 25, disposed between the light path converting unit 30 and the photodetector 21, filters the light other than the light reflected from the light source 11. As such, by including the filter member 25, the ambient light other than the light reflected from the light source 11, which is incident into the photodetector 21, is filtered, thereby improving monitoring accuracy for the light output of the light source 11.

The light path converting unit 30 is installed between the optical member 15 and the sensor unit 20, the part of the light irradiated from the light source 11 and reflected from the light incident surface 15a of the optical member 15 is transferred to the sensor unit 20. In the first embodiment is described the light emitting device including, by way of example, a mirror (M) as the light path converting unit 30 for allowing the partial light (Lr) reflected from the optical member 15 to travel toward the sensor unit 20.

The intensity adjusting unit 40 adjusts the intensity of the light source 11 based on the signal detected from the photodetector 21 and checks whether there is abnormality in the light emitting device. That is, when the light output of the light source 11 is less than a predetermined value, the intensity adjusting unit 40 increases electric power (voltage or current) applied to the light source 11, and when the light output of the light source 11 exceeds the predetermined value, the intensity adjusting unit 40 controls the light source 11 to decrease the electric power applied to the light source 11. In addition, when there is no light output from the light source 11, the intensity adjusting unit 40 transmits a signal to the outside so as to check whether abnormality has occurred to the light source 11.

With the above-described configuration, the light emitting device according to the first embodiment of the present disclosure may real-time monitor the light output of the light source 11 for irradiating light of a predetermined wavelength and may control the same through the intensity adjusting unit 40. Therefore, according to the present disclosure, the light output of the light source 11 may be maintained in a constant range even when there is an environmental change, such as a temperature change or deterioration of the light source 11 due to long-time use. In addition, when abnormality has occurred to the light source 11, a signal is transmitted to the outside, and thus can check for the abnormality.

FIG. 2 is a schematic view showing a light emitting device according to a second embodiment of the present disclosure.

Referring to FIG. 2, the light emitting device according to a second embodiment may include a main body 1, and light emitting units 11 and 15, a sensor unit 20, an light path converting unit 30 and an intensity adjusting unit 40, which are installed in the main body 1. Here, since components other than the light path converting unit 30 are substantially the same as those of the light emitting device according to the first embodiment, detailed descriptions thereof will not be given.

The light path converting unit 30 may include a reflection member 31 formed on a light incident surface 15a of the optical member 15. The reflection member 31 reflects part of the light irradiated from the light source 11 so as to face toward the sensor unit 20. As such, by including the reflection member 31, the part of the light irradiated from the light source 11 may be reflected to the sensor unit 20 regardless of conditions of total reflection on the light incident surface 15a.

FIG. 3 is a schematic view showing a light emitting device according to a third embodiment of the present disclosure.

Referring to FIG. 3, the light emitting device according to a third embodiment includes first and second light emitting modules A10 and B10 disposed to be adjacent to each other in a main body 1 and controlled to be independently driven. Here, the first and second light emitting modules A10 and B10 include light emitting units 11 and 15, sensor units 21 and 25, a light path converting unit (30 of FIG. 2), and a intensity adjusting unit 40, respectively, which are substantially the same as the components denoted by the same reference numerals in the light emitting devices according to the first and second embodiments of the present disclosure.

As described above, when the first and second light emitting modules A10 and B10 are formed in the main body 1, any one of the first and second light emitting modules A10 and B10 may be driven or both of the first and second light emitting modules A10 and B10 may be simultaneously driven. In addition, in the present embodiment, two light emitting modules are illustrated by way of example, but not limited thereto. Rather, two or more light emitting modules may be provided in the light emitting device according to the present invention.

As such, by including a plurality of light emitting modules controlled to be independently driven, the light emitting device may be controlled according to uses. Therefore, the light emitting device may be applied to various application fields including curing, exposure, sterilization, cleaning, etc.

FIG. 4 is a schematic view showing a light emitting device according to a fourth embodiment of the present disclosure.

Referring to FIG. 4, the light emitting device according to a fourth embodiment includes first and second light emitting modules A20 and B20 disposed to be adjacent to each other in a main body 1 and controlled to be independently driven, a sensor unit 120, and an intensity adjusting unit 140. Here, the first and second light emitting modules A20 and B20 include light emitting units 11 and 15 and a light path converting unit (30 of FIG. 2), respectively, which are substantially the same as the components denoted by the same reference numerals in the light emitting devices according to the first and second embodiments of the present disclosure. In addition, in the present embodiment, two light emitting modules are illustrated by way of example, but not limited thereto. Rather, two or more light emitting modules may be provided in the light emitting device according to the present invention.

Here, each of the sensor unit 120 and the intensity adjusting unit 140 may be commonly applied to at least two of the plurality of light emitting modules. That is, one sensor unit 120 and one intensity adjusting unit 140 may be provided with respect to the first and second light emitting modules A10 and B10. In this case, when the intensity of each of the first and second light emitting modules A10 and B10 is to be adjusted, the light emitted may be monitored through the sensor unit 120 while selectively driving the first light emitting module A20 and the second light emitting module B20, and the intensity of a light source may be adjusted through the intensity adjusting unit 140.

When the light emitting device is configured in such a manner, the configuration can be simplified while performing the same function, as compared with the light emitting device according to the third embodiment.

FIG. 5 is a schematic view showing a light emitting device according to a fifth embodiment of the present disclosure.

Referring to FIG. 5, the light emitting device according to a fifth embodiment includes first and second light emitting modules A20 and B20 disposed to be adjacent to each other in a main body 1 and controlled to be independently driven, a sensor unit 120, and an intensity adjusting unit 140. The light emitting device according to a fifth embodiment differs from the light emitting device according to the fourth embodiment in that the former further includes a waveguide tube 35 as the light path converting unit 30, and other components are substantially the same as those of the light emitting device according to the fourth embodiment.

The waveguide tube 35 is installed between the reflection member 31 and the sensor unit 120 and guides the light reflected from the reflection member 31 to the sensor unit 120. As such, when the waveguide tube 35 is provided, installation positions of the sensor unit 120 can be freely changed, and thus the limitation in the installation positions can be minimized.

FIG. 6 is a schematic block diagram showing a curing apparatus employing a light emitting device according to an embodiment of the present disclosure. Referring to FIG. 6, the curing apparatus according to the present disclosure includes the above-described light emitting device and a control unit 50. The light emitting device includes a main body 1, and a light emitting unit 10, a sensor unit 20 and an intensity adjusting unit 40, which are installed in the main body 1. The light emitting device is substantially the same as the light emitting devices according to the above-described embodiments having been described with reference to FIGS. 1 to 5, and detailed descriptions thereof will not be given. The control unit 50, which is installed outside the main body 1, controls the light emitting unit 10 and the sensor unit 20, respectively, in conformity to curing conditions.

FIG. 7 is a schematic view showing a light emitting device according to a sixth embodiment of the present disclosure.

Referring to FIG. 7, the light emitting device according to a sixth embodiment of the present disclosure may include a light emitting unit 210 disposed in a main body 201, a photodetector 221, and an intensity adjusting unit 240. The main body 201 means a housing and may be modified in various shapes according to uses. The main body 201 includes a window 201a through which the light irradiated from the light emitting unit 210 is emitted. An optical member 215 to be described later may be installed on the window 201a.

In addition, the main body 201 may have a reflection surface 205 formed on the internal surface around the window 201a. The reflection surface 205 may be total-reflection coated to allow incident light to be totally reflected, or the main body 201 is formed using a glass material to then be disposed to allow light to be incident at an angle greater than a critical angle, thereby performing total reflection. In addition, the reflection surface 205 may also be formed to diffusively reflect incident light. Accordingly, part of the light irradiated from the light emitting unit 210 is incident into the reflection surface 205 and is totally reflected or diffusively reflected from the reflection surface 205 to then travel toward the photodetector 221.

The light emitting unit 210 is installed in the main body 201 and generates and irradiates light of a predetermined wavelength. To this end, the light emitting unit 210 may include a light source 211 for generating and irradiating light, and an optical member 215. The light emitting unit 210 is substantially the same as the light emitting unit of the light emitting device according to the first embodiment, and detailed descriptions thereof will not be given.

The photodetector 221, which is installed in the main body 201, is disposed to be adjacent to the light source 211.

The photodetector 221 receives the light irradiated from the light source 211 and reflected from the reflection surface 205 of the main body 201, thereby monitoring the light output of the light source 211.

The intensity adjusting unit 240 adjusts the intensity of the light source 211 based on the signal detected from the photodetector 221. The intensity adjusting unit 240 is substantially the same as the intensity adjusting unit of the light emitting device according to the first embodiment, and detailed descriptions thereof will not be given.

Meanwhile, when configured as described above, as shown in FIG. 8, the externally applied light (Le) may be incident into the main body 201 through the window 201a. Here, when the photodetector 221 is disposed on the path of the external light Le incident into the main body 201 (as shown in FIG. 8, when the photodetector 221 is disposed to be spaced a distance C apart from the center of the light emitting unit 210, noise light may be received. Accordingly, it may be difficult to determine whether the light source malfunctions or to control the light output of the light source.

In consideration of the aforementioned disadvantages, the light emitting device according to the present embodiment has a feature wherein arrangement of constituents is optimized so as to prevent the external light Le from being incident into the photodetector 221.

FIG. 9 shows a modification example of the light emitting device according to a sixth embodiment of the present disclosure.

Referring to FIG. 9, the light Le applied from the outside of the main body 201 may be incident into the main body 201 through the window 201a. Here, in view of the position where the external light Le on a plane P extending from the light receiving surface of the photodetector 221, the external light Le may be incident up to a position spaced a distance C1 apart from the center of the light emitting unit 210. That is, the external light Le, which is incident over the entire area of the window 201a, is incident into the main body 201 within a limited range of the window 201a. Accordingly, the external light Le may not reach the position deviating from the position spaced the distance C1 apart from the center of the light emitting unit 210. Here, the distance C1 is determined by a diameter (D) of the window 201a, a distance (A) between the plane P and the external side surface of the main body 201, and a distance (B) between the plane P and the internal side surface of the main body 201.

In consideration of the foregoing, the photodetector 221 may be disposed at a position deviating from the position where the external light Le reaches. That is, the photodetector 221 may be disposed at a position deviating from the position spaced a distance C2 (C2>C1) apart from the center of the light emitting unit 210. That is, the distance C2 may satisfy the following conditional formula 1:

$$C2 > \frac{D(A+B)}{2(A-B)} \quad \text{[Conditional formula 1]}$$

where C2 is a distance between the center of the light emitting unit 210 and the photodetector 221 on the plane P.

By satisfying the above-described condition, it is possible to prevent the external light Le from being incident into the photodetector 221.

In addition, in the present embodiment, when the photodetector 221 is disposed in the main body 201, the photodetector 221 may be fixedly disposed such that the distance between the light emitting unit 210 and the photodetector 221 becomes an arbitrary distance (W). In this case, in order to prevent the external light Le from being incident into the photodetector 221, the distance A between the plane P and the external surface of the main body 201 may be set to satisfy the following conditional formula 2:

$$A > \frac{B(2W+D)}{(2W-D)} \quad \text{[Conditional formula 2]}$$

where D is a diameter of the window, and B is a distance between the plane P and the internal surface of the main body 201.

FIG. 10 shows another modification example of the light emitting device according to a sixth embodiment of the present disclosure, and FIG. 11 is a partially enlarged view of a portion XI shown in FIG. 10.

First, as shown in FIGS. 8 to 9, when the reflection surface 205 of the main body 201 is formed in a flat plate shape, the loss of light irradiated from the light source 211 and reflected from the reflection surface 205 is reduced and thus can be reflected by the photodetector 221. Meanwhile, since the traveling path of light is specified, it is inevitable that the photodetector 221 is limited to the C2 position in the arrangement. In addition, when diffuse reflection is applied to the reflection surface, the position of the photodetector can be arbitrarily adjusted, but the light intensity may decrease due to the loss of light reaching the photodetector.

In consideration of the aforementioned feature, as shown in FIG. 10, the light emitting device according to the present modification example has an improved degree of freedom in the arrangement of a photodetector 221' by modifying a reflection surface 205'. That is, the reflection surface 205' is used for mirror reflection, and the reflection angle of the reflected light can be changed by forming a groove in the reflected portion. As shown in FIG. 11, the reflection surface 205' may be formed into a groove having a V-shaped section, thereby allowing the light irradiated from the light source 211 to travel toward the photodetector 221' located at a position C3, instead of the position of the photodetector 221 shown in FIG. 8. Here, the position C3 is a distance between the photodetector 221' and the center of the light source 211, and is located at a shorter position than the C2 position.

In the present embodiment, a V-shaped groove has been described as an example, but the present invention is not limited thereto, and may be formed in various shapes in which the reflection path of light can be changed.

FIG. 12 shows a beam path of external light Le when an optical member (215) having a refractive index n2 is installed on the window (201a) of FIG. 7.

Referring to FIG. 12, when the optical member 215 is not provided, the external light Le is incident in the path as indicated by the dotted arrow, and thus hits the sidewall of the window 201a of the main body 201, so that the external light Le may not proceed to the photodetector 221. Accordingly, external noise is not incident into the photodetector 221. Meanwhile, when a transparent optical member 215 is installed for the purpose of protecting the inside of the main body 201, the external light Le incident at an incidence angle α may be refracted at an emission angle β while refracting at the incident surface of the optical member 215, and may then be incident into the photodetector 221 installed in the main body 201.

FIG. 13 is a schematic diagram showing a light emitting device according to a seventh embodiment of the present disclosure. Referring to FIG. 13, the light emitting device according to a seventh embodiment of the present disclosure may include a main body 201, a light emitting unit 210 disposed in the main body 201, a photodetector 221, and a light blocking unit 250. A window 201a through which the light irradiated from the light source 211 of the light emitting unit 210 is emitted is formed in the main body 201, and an optical member 215 is installed on the window 201a. When the optical member 215 is employed, the light blocking unit 250 blocks the external light from traveling to the photodetector 221. The light blocking unit 250 has an opening coaxially opened by a diameter D' on the window 201a. The light blocking unit 250 is made of an opaque material having a thickness T, and blocks the external light Le incident in the same path as shown in FIG. 12 from entering the window 201a by the geometrical shape and arrangement. As such, by installing the light blocking unit 250, it is possible to prevent the external light Le from entering the photodetector 221.

In order to block the light by the geometrical shape and arrangement of the light blocking unit 250, the thickness T of the light blocking unit 250 may satisfy the following conditional formula 3:

[Conditional formula 3]
$$T \geq \frac{A-B}{D} \cdot \{\frac{D+D'}{2} - (A-B)\}$$

$$\tan^{-1}\left[\frac{\sin\{\pi/2 - \tan^{-1}(\frac{A-B}{D})\}}{n_2}\right]$$

where A is a distance between the incident plane of the photodetector 221 and the external surface of the main body 201, B is a distance between the incident plane of the photodetector 221 and the internal surface of the main body 201, D is a diameter of the window 201a, and n2 is a refractive index of the optical member 215.

In addition, the optical member 215 may be made of a transparent material having a refractive index (n2) of 1-1.7. The refractive index n2 is determined by reflecting the following simulation results.

FIG. 14 is a graph representing the relationship between a Value of T and an incident light intensity (normalization) with a refractive index n2 increasing by 0.1 from 1.0 to 1.8, and FIG. 15 is a graph representing the relationship between a T/D value an incident light intensity (normalization) when the refractive index n2 is 1.7.

Referring to FIG. 14, it is confirmed that the incident light intensity increases as the refractive index n2 value increases under the same T value condition. Meanwhile, due to the structure of the light emitting device, the value of T (thickness) should be smaller than the diameter D of the window of the main body. Referring to FIG. 15, the maximum refractive index n2 that satisfies the condition where T/D is less than 1 is 1.7. In consideration of this feature, the refractive index n2 of the optical member may be set to 1-1.7.

In the present embodiment, a flat plate-shaped transparent member is exemplified as the optical member, but the present invention is not limited thereto, and various modifications including changing the flat plate-shaped structure to a convex lens structure that focuses the irradiated light, are possible.

While the present disclosure has been specifically described in reference to the preferred embodiments and drawings, it is contemplated that the scope of the invention is defined by the following claim and modifications and equivalents thereof will be made within the spirit of the invention.

What is claimed is:

1. A light emitting device comprising:
a main body having a window;
a light source installed in the main body, for generating light with a predetermined wavelength and irradiating the generated light to the outside of the main body through the window;
a photodetector installed in the main body, for receiving a part of the light irradiated from the light source and monitoring an intensity of the light source;
a light path converting unit installed between the light source and the photodetector, for transferring the part of the light irradiated from the light source to the photodetector; and
an intensity adjusting unit for adjusting the intensity of the light source based on a signal detected from the photodetector,
wherein the photodetector is disposed to be spaced a distance C2 apart from the center of the light source, and the distance C2 satisfies the conditional formula 1 to prevent the external light Le incident from the outside of the main body from being incident into the photodetector:

[Conditional formula 1]
$$C2 > \frac{D(A+B)}{2(A-B)}$$

where C2 is a distance between the center of the light source and the photodetector on a plane P extending from the light receiving surface of the photodetector, D is a diameter of the window, A is a distance between the plane P and the external surface of the main body, and B is a distance between the plane P and the internal surface of the main body.

2. The light emitting device of claim 1, further comprising a filter member disposed between the light path converting unit and the photodetector, for filtering the light with the predetermined wavelength to travel toward the photodetector.

3. The light emitting device of claim 1, further comprising an optical member installed on the window, for transmitting most of the light irradiated from the light source in predetermined magnification power, wherein the part of the light irradiated from the light source is reflected on the light incident surface of the optical member, and the light path converting unit comprises a mirror for reflecting the light reflected from the optical member to travel toward the photodetector.

4. The light emitting device of claim 3, wherein the light path converting unit comprises a reflection member, formed on the light incident surface of the optical member, for reflecting the part of the light irradiated from the light source to travel toward the photodetector.

5. The light emitting device of claim 4, wherein the light path converting unit further comprises a waveguide tube, installed between the reflection member and the photodetector, for guiding the light reflected from the reflection member to the photodetector.

6. The light emitting device of claim 1, wherein when the light source, the photodetector, the light path converting unit, and the intensity adjusting unit are referred to as a light emitting module, two or more light emitting modules each independently driven are included in the main body.

7. The light emitting device of claim 1, wherein when the light source and the light path converting unit are referred to as a light emitting module, a plurality of light emitting modules are included in the main body, and each of the photodetector and the intensity adjusting unit is commonly applied to at least two of the plurality of light emitting modules.

8. The light emitting device of claim 1, wherein the photodetector is disposed to be adjacent to the light source, and includes a reflection surface formed on the internal surface around the window and allowing incident light to be totally reflected.

9. The light emitting device of claim 8, wherein the photodetector is fixedly disposed such that the distance between the light source and the photodetector becomes an arbitrary distance (W), and the distance A between the plane P and the external surface of the main body satisfies the conditional formula 2:

$$A > \frac{B(2W+D)}{(2W-D)} \quad \text{[Conditional formula 2]}$$

where D is a diameter of the window, and B is a distance between the plane P and the internal surface of the main body.

10. The light emitting device of claim 8, wherein a groove is recessed in the reflection surface so as to change the reflection angle of the reflected light.

11. The light emitting device of claim 1, further comprising:
 a transparent optical member having a refractive index n2, installed on the window, for transmitting most of the light irradiated from the light source in predetermined magnification power; and
 a light blocking unit having an opening coaxially opened by a diameter D' on the window, made of an opaque material having a thickness T, and blocking the external light from entering the main body through the window.

12. The light emitting device of claim 11, wherein the thickness T of the light blocking unit satisfies the conditional formula 3:

$$T \geq \frac{A-B}{D} \cdot \{\frac{D+D'}{2} - (A-B)\}$$

$$\tan^{-1}\left[\frac{\sin\{\pi/2 - \tan^{-1}(\frac{A-B}{D})\}}{n_2}\right] \quad \text{[Conditional formula 3]}$$

where A is a distance between the incident plane of the photodetector and the external surface of the main body, B is a distance between the incident plane of the photodetector and the internal surface of the main body, and D is a diameter of the window.

13. The light emitting device of claim 12, wherein the refractive index n2 of the optical member is 1-1.7.

14. A curing apparatus comprising:
 the light emitting device of claim 1; and
 a control unit, installed outside a main body, for controlling a light source and a photodetector, respectively, according to curing conditions.

15. The curing apparatus of claim 14, wherein the light emitting device further comprising a filter member disposed between the light path converting unit and the photodetector, for filtering the light with the predetermined wavelength to travel toward the photodetector.

16. The curing apparatus of claim 14, wherein the main body includes a reflection surface formed on the internal surface around the window and allowing incident light to be reflected, and the photodetector is fixedly disposed such that the distance between the light source and the photodetector becomes an arbitrary distance (W), and the distance A between the plane P and the external surface of the main body satisfies the conditional formula 4:

$$A > \frac{B(2W+D)}{(2W-D)} \quad \text{[Conditional formula 4]}$$

where D is a diameter of the window, and B is a distance between the plane P and the internal surface of the main body.

17. The curing apparatus of claim 14, wherein the light emitting device further comprises:
 a transparent optical member having a refractive index n2, installed on the window, for transmitting most of the light irradiated from the light source in predetermined magnification power; and
 a light blocking unit having an opening coaxially opened by a diameter D' on the window, made of an opaque material having a thickness T, and blocking the external light from entering the main body through the window.

18. The curing apparatus of claim 17, wherein the thickness T of the light blocking unit satisfies the conditional formula 5:

$$T \geq \frac{A-B}{D} \cdot \{\frac{D+D'}{2} - (A-B)\} \quad \text{[Conditional formula 5]}$$

$$\tan^{-1}\left[\frac{\sin\{\pi/2 - \tan^{-1}(\frac{A-B}{D})\}}{n_2}\right]$$

where A is a distance between the incident plane of the photodetector and the external surface of the main body, B is a distance between the incident plane of the photodetector and the internal surface of the main body, and D is a diameter of the window.

* * * * *